United States Patent
Lowerson et al.

(10) Patent No.: US 12,434,614 B2
(45) Date of Patent: Oct. 7, 2025

(54) TIPPER ASSEMBLY

(71) Applicant: Caterpillar SARL, Geneva (CH)

(72) Inventors: Julian Lowerson, Bourne (GB); Mark Stoker, Seaham (GB)

(73) Assignee: Caterpillar SARL, Geneva (CH)

( * ) Notice: Subject to any disclaimer, the term of this patent is extended or adjusted under 35 U.S.C. 154(b) by 989 days.

(21) Appl. No.: 17/613,806

(22) PCT Filed: May 21, 2020

(86) PCT No.: PCT/EP2020/025237
§ 371 (c)(1),
(2) Date: Nov. 23, 2021

(87) PCT Pub. No.: WO2020/239257
PCT Pub. Date: Dec. 3, 2020

(65) Prior Publication Data
US 2022/0219588 A1 Jul. 14, 2022

(30) Foreign Application Priority Data
May 24, 2019 (GB) ..................... 1907390

(51) Int. Cl.
*B60P 1/00* (2006.01)
*B60P 1/267* (2006.01)

(52) U.S. Cl.
CPC ................... *B60P 1/267* (2013.01)

(58) Field of Classification Search
CPC ............... B60P 1/267; B60P 1/26; B60P 1/28
(Continued)

(56) References Cited

U.S. PATENT DOCUMENTS 2,439,585 A * 4/1948 Snow ........................ B60P 1/26
298/23 DF
4,621,858 A * 11/1986 Hagenbuch ............... B60P 1/26
298/23 DF
(Continued)

FOREIGN PATENT DOCUMENTS

GB 1392510 4/1975
JP S58017233 U 7/1956
(Continued)

OTHER PUBLICATIONS

International Search Report related to Application No. PCT/EP2020/025237; reported on Sep. 10, 2020.
(Continued)

*Primary Examiner* — Steven O Douglas

(57) ABSTRACT

A tipper assembly comprises a chassis having a first chassis linkage point; a body pivotally attached to the chassis about a body pivot axis, the body being pivotable between a lowered position and a raised position; a tailgate moveable between a closed position in which the tailgate is arranged across an end opening of the body and an open position in which the tailgate is pivoted away from the end opening; and a first tailgate lift assembly configured to lift the tailgate from the closed position to the open position on movement of the body from the lowered position to the raised position. The first tailgate lift assembly comprises: a first arm having a tailgate end fixedly attached to the tailgate and a first arm linkage point, the first arm being pivotally attached to the body about an arm pivot axis, the arm pivot axis being arranged between the tailgate end and the first arm linkage point; and a first linkage assembly connecting the first arm linkage point to the first chassis linkage point, the first linkage assembly comprising an arm link and a rapid opening assembly, the rapid opening assembly having a first end attached to the body or the chassis and a second end attached (Continued)

to an intermediate portion of the arm link. The rapid opening assembly is configured to create a v-shape in the arm link, drawing the first arm linkage point closer to the first chassis linkage point on rotation of the body about the body pivot axis from the lowered to the raised position.

14 Claims, 11 Drawing Sheets

(58) Field of Classification Search
USPC .......................................................... 298/23 R
See application file for complete search history.

(56) References Cited

U.S. PATENT DOCUMENTS

| | | | | |
|---|---|---|---|---|
| 5,503,462 | A * | 4/1996 | Capps | B60P 1/267 |
| | | | | 298/23 D |
| 5,726,288 | A | 3/1998 | Call et al. | |
| 5,887,914 | A * | 3/1999 | Hagenbuch | B60P 1/267 |
| | | | | 296/183.2 |
| 6,491,349 | B2 * | 12/2002 | McCafferty | B60P 1/26 |
| | | | | 298/23 D |
| 6,726,288 | B2 * | 4/2004 | Hagenbuch | B60P 1/283 |
| | | | | 298/23 D |
| 6,893,099 | B2 | 5/2005 | O'Brien | |
| 2021/0188146 | A1 * | 6/2021 | Lock | B60P 1/26 |
| 2024/0116423 | A1 * | 4/2024 | Shin | B60P 1/283 |

FOREIGN PATENT DOCUMENTS

| | | |
|---|---|---|
| JP | S57087728 A | 6/1982 |
| JP | 2003191784 A | 7/2003 |
| RU | 2057657 C1 | 4/1996 |

OTHER PUBLICATIONS

Great Britain Search Report related to Application No. 1907390.7; reported on Sep. 11, 2019.

* cited by examiner

TIPPER ASSEMBLY

This patent application is a 35 USC § 371 U.S. national stage of International Application No. PCT/EP2020/025237 filed on May 21, 2020, which claims the benefit and priority of Great Britian Application No. 1907390.7 filed on May 24, 2019, the disclosures of which are incorporated in their entirety by reference herein.

BACKGROUND

The disclosure relates to the field of tipper assemblies, more particularly tipper assemblies for use in dump trucks, tipper trucks and/or the like.

Dump trucks, also known as tipper trucks, can be fitted with a tailgate to close off the end of the truck body to increase payload volume and reduce spillage during hauling.

It is known to provide a separate tailgate actuation mechanism, powered independently from the truck body tipping mechanism. This adds cost and complexity to the system.

Alternatively, a pivoting arm mechanism actuated by a single tie or chain may be used to open the tailgate. The chain or tie may be connected to an end of the pivoting arm and to the chassis. The chain or tie causes the arm to move relative to the truck body as the truck body is pivoted into the raised tipping position relative to the chassis by the tipping actuators, thereby opening the tailgate. Such mechanisms may be limited by the geometry of the tailgate, the truck body and the chassis and may result in a restricted opening rate.

SUMMARY

Against this background there is provided a tipper assembly configured to open the tailgate quickly and efficiently to avoid interfering with the free flow of the payload as the truck body is raised into a raised "tipping" position, to avoid damage and destabilisation of the machine.

In embodiments of the present disclosure, a tailgate lift assembly is configured to lift the tailgate from a closed position to the open position on movement of the body from the lowered position to the raised position. The dump truck or the like comprises a chassis and a truck-bed/dump-body, and the truck-bed is pivotally attached to the chassis about a truck-bed pivot axis. The truck-bed is configured to contain a load to be carried by the truck and is coupled with the chassis so that it can be moved between a lowered position for transporting the load and a raised position for emptying the load from the truck-bed. The truck-bed includes a tailgate that is designed to maintain the load within the truck-bed during transport.

In accordance with embodiments of the present disclosure, the tailgate is moveable between a closed position, in which the tailgate closes an end opening of the truck-bed and an open position in which the tailgate is pivoted away from the end opening leaving an opening through which the load can be emptied from the truck-bed.

In embodiments of the present disclosure, the tailgate is coupled with a tailgate lift assembly. The tailgate lift assembly is configured to lift the tailgate from the closed position to the open position when the truck bed is raised from the lowered position to the raised position.

In embodiments of the present disclosure, the tailgate lift assembly includes arms on either side of the truck bed that extend from the tailgate, to which the arms are coupled, to a linkage point. The arms are each pivotally attached to the truck-bed at a pivot point, where the pivot point is disposed between the tailgate and the linkage point.

In embodiments of the present disclosure, a first tailgate lift assembly comprises a first arm having a tailgate end fixedly attached to the tailgate and a first arm linkage point, the first arm being pivotally attached to the body about an arm pivot axis, the arm pivot axis being arranged between the tailgate end and the first arm linkage point.

In embodiments of the present disclosure, a first linkage assembly connects the first arm linkage point to the first chassis linkage point, the first linkage assembly comprising an arm link and a rapid opening assembly having a first end attached to the body or chassis and a second end attached to an intermediate portion of the first arm link. The rapid opening assembly is configured to create a v-shape in the arm link, drawing the first arm linkage point closer to the first chassis linkage point on rotation of the body about the body pivot axis from the lowered to the raised position.

The linkage assembly is configured to draw the linkage point closer to the chassis linkage point when the truck-bed is raised. The drawing of the tailgate linkage point closer to the chassis linkage point causes the tailgate-opening assembly to increase the rate at which the tailgate is opened.

BRIEF DESCRIPTION OF THE DRAWINGS

Embodiments of the disclosure are now described with reference to the accompanying drawings, in which.

DETAILED DESCRIPTION

Figure 1:
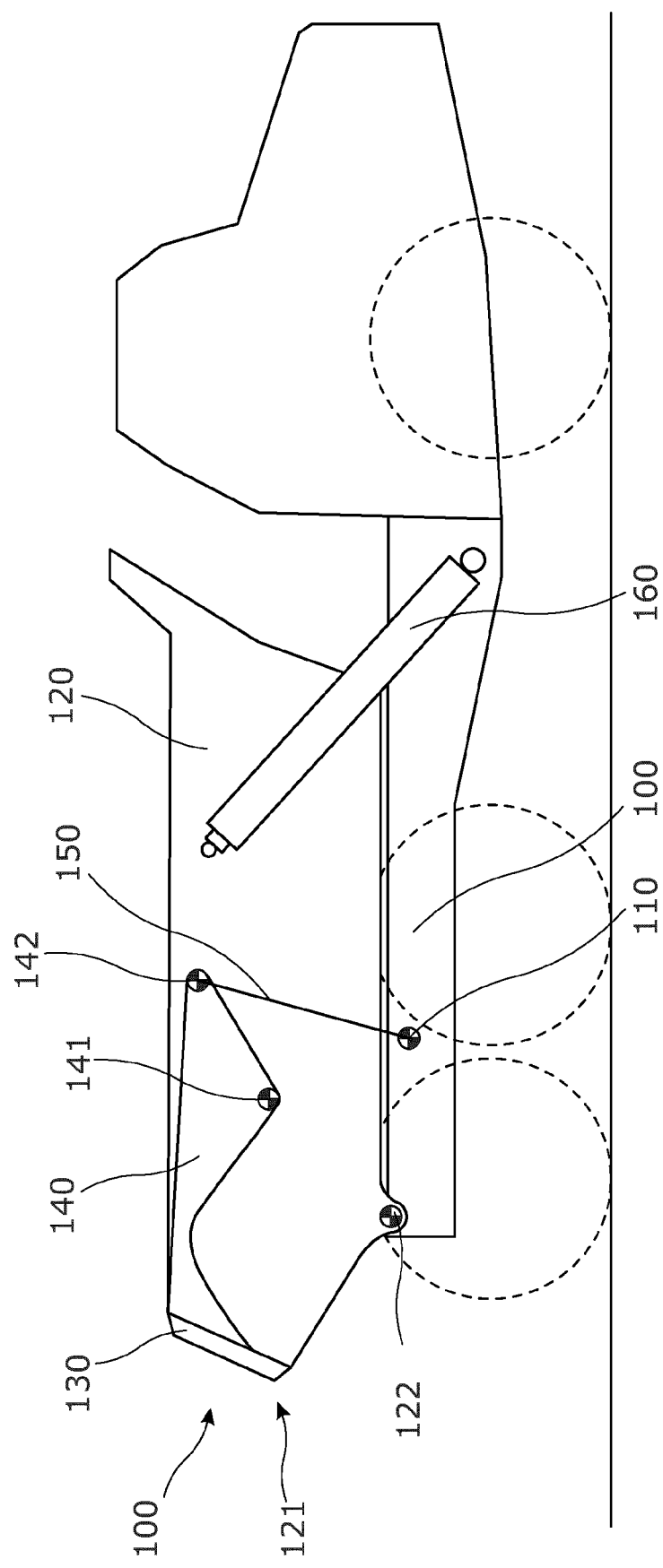
FIG. 1 shows a schematic representation of a tipper assembly according to the prior art in a lowered position.
Figure 2:
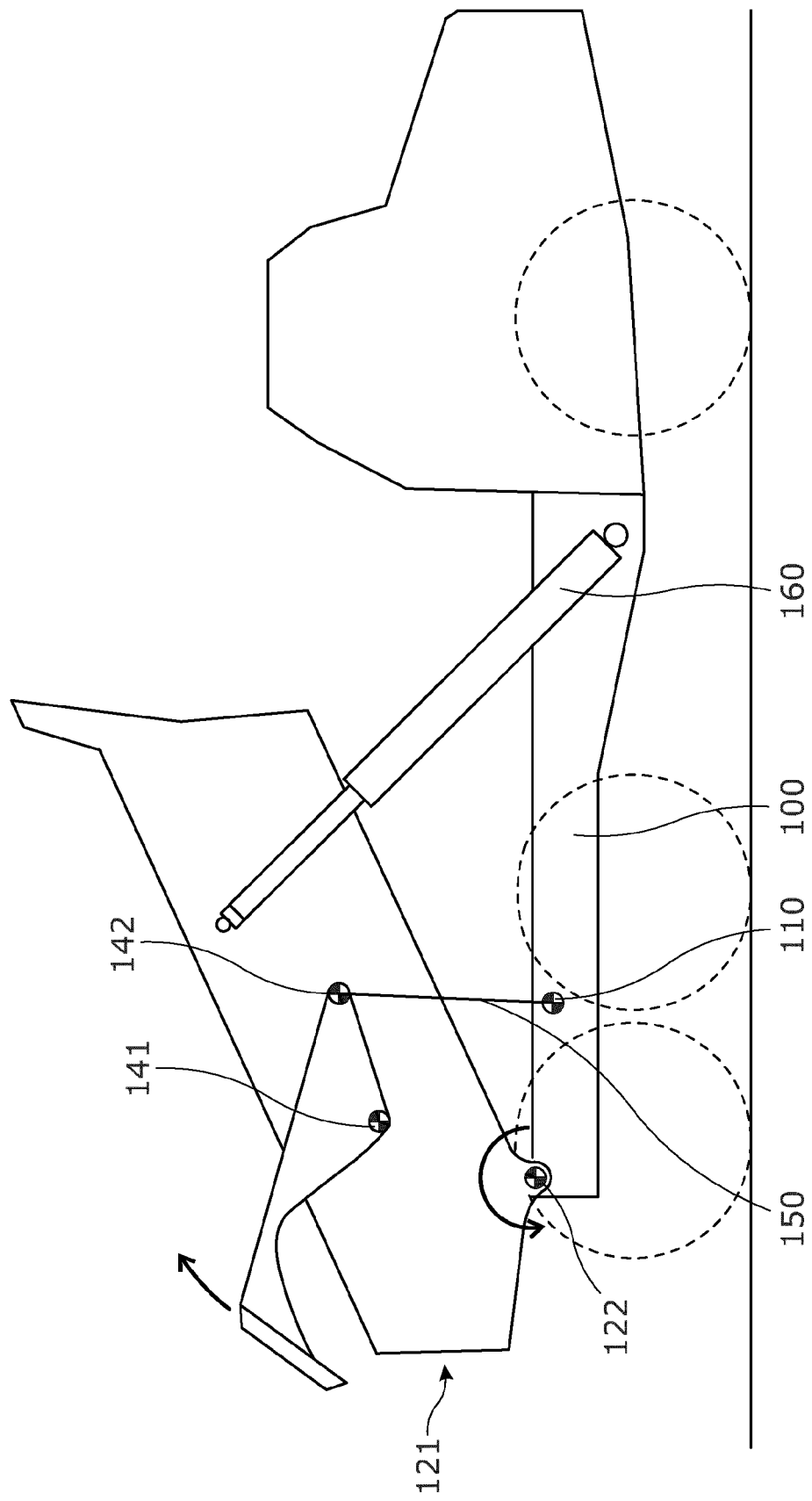
FIG. 2 shows a schematic representation of the tipper assembly of FIG. 1 in an intermediate position during raising of the tailgate.

A tipper truck comprising a tipper assembly 100 in accordance with the prior art is shown in FIGS. 1 and 2. The tipper assembly may comprise a chassis 110 and a body 120 for receiving a load of material. The body 120 may be pivotably attached to the chassis 110 at a body pivot axis 122 such that the body can be pivoted about a body pivot axis 122 from a lowered position as shown in FIG. 1 to a raised or lifted position in which the load of material can flow out of an end opening 121 of the body 120 as shown in FIG. 2.

In the lowered position, a tailgate 130 may be arranged in a closed position across the end opening 121. The tailgate 130 may be attached to an arm 140. The arm 140 may be pivotably attached to the body 120 about an arm pivot axis 141 arranged in an intermediate portion of the arm 140, such that the arm 140 and the tailgate 130 may be pivoted relative to the body 120, lifting the tailgate 130 to an open position away from the end opening 121. A chain or tie 150 may be attached to an arm linkage point 142 arranged at a distal end of the arm 140 to the tailgate 130. The chain or tie 150 may be further attached to a chassis linkage point 111 on the chassis 110, thereby attaching the chassis linkage point 111 to the arm linkage point 142.

As the body 120 is pivoted into its lifted position under the action of a tipper actuator 160, the arm pivot axis 141, being in a fixed position relative to the body 120, may move in an upwards arc. The chain or tie 150 may hold the arm linkage point 142 of the arm at a fixed distance relative to the chassis 110, thereby causing the arm 140 to pivot relative to the body 120 about the arm pivot axis 141 and lifting the tailgate 130 into the open position.

The tailgate 130 may therefore be lifted into the open position by the tipper actuator 160 as a result of the action of the chain or tie 150 and the tipper actuator 160 lifting the body to the open position. The pivoting action may result in an arcuate motion of the tailgate 130 outwards and upwards from its original position. The shape of the arc may therefore be dictated by the fixed length and pivoting motion of the chain or tie 150. Where a chain 150 is used, any slack in the chain is taken up by initial movement of the body such that the arm linkage point 142 first moves away from and then at a fixed distance to the chassis linkage point 111 as the body is lifted from the lowered to the raised position.

Figure 3:
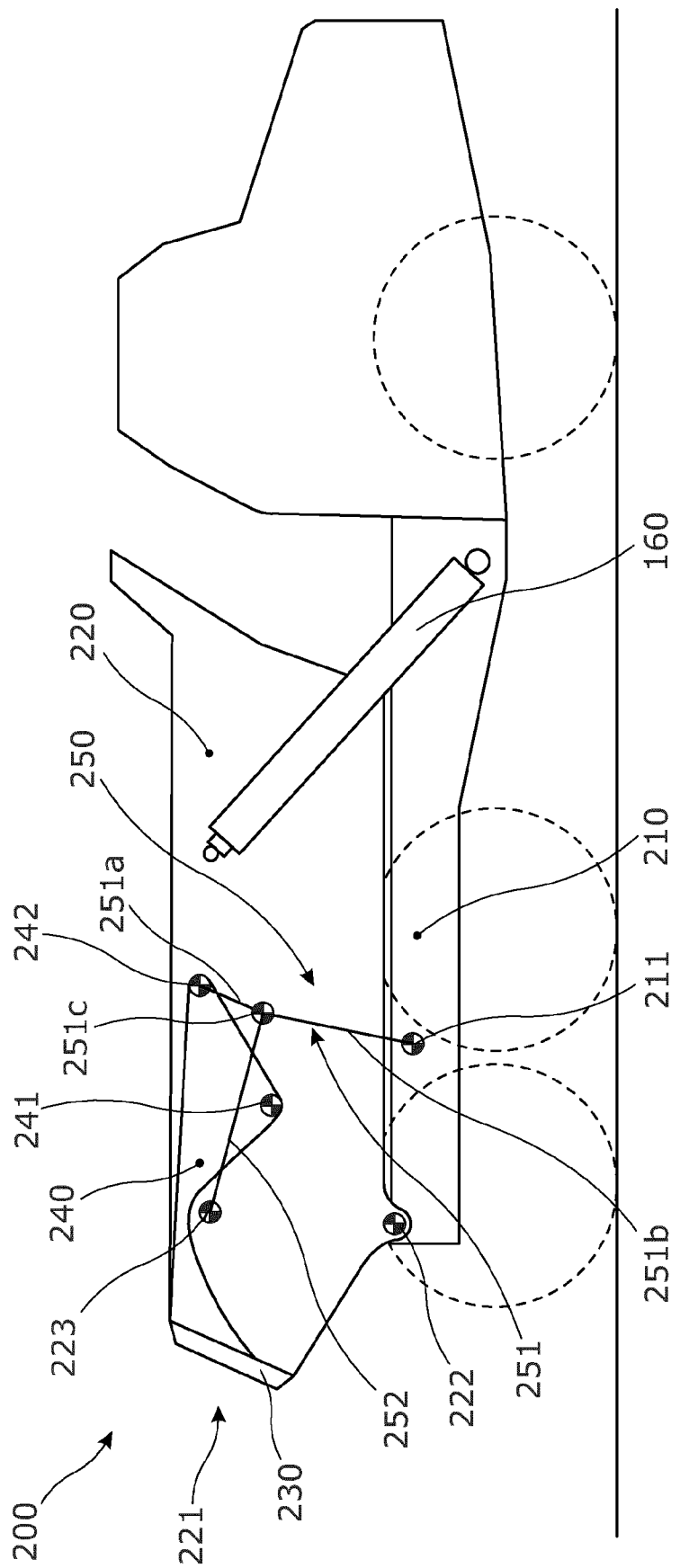
FIG. 3 shows a schematic representation of a tipper assembly according to the present disclosure in a lowered position.
Figure 4:
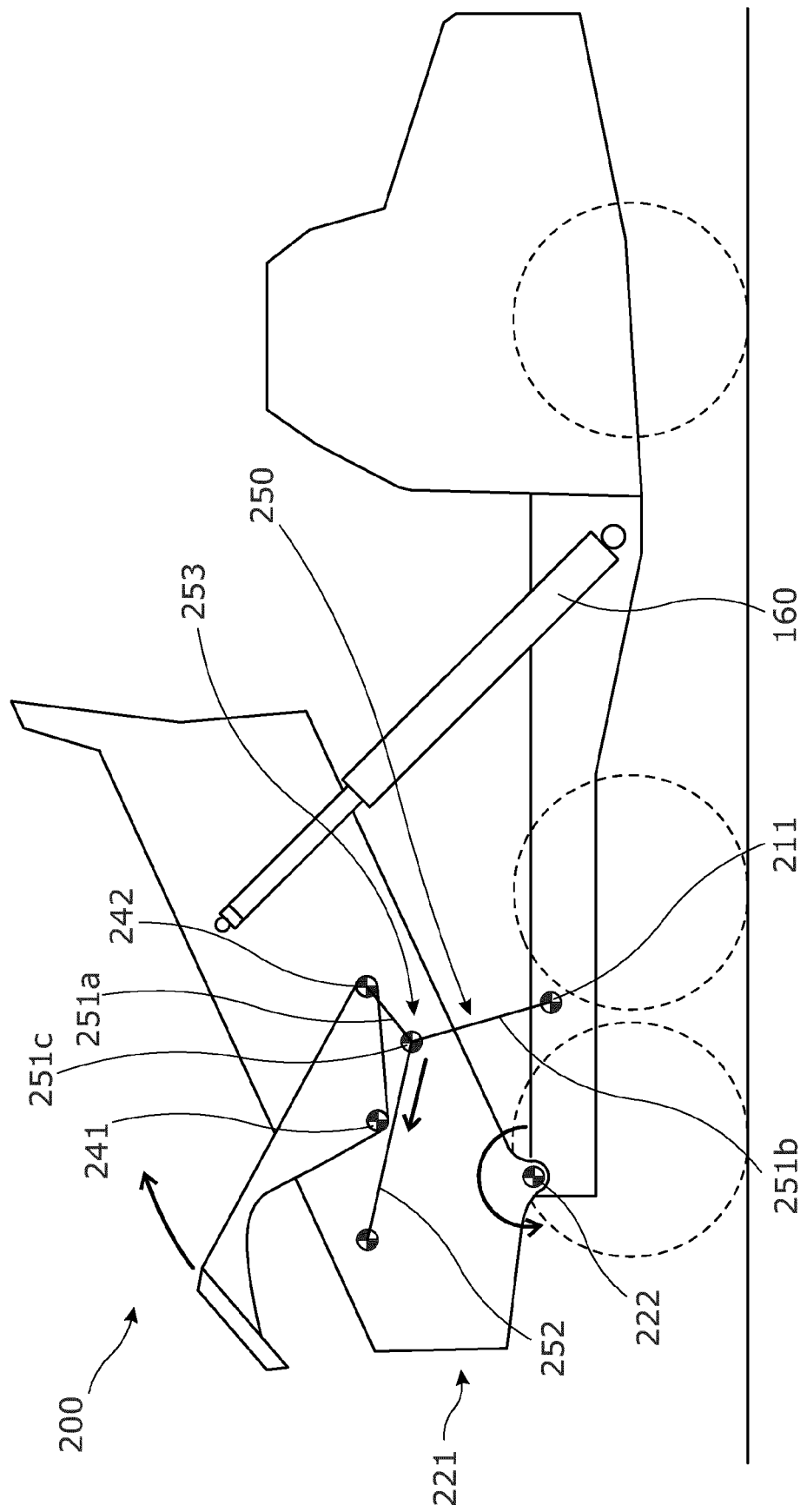
FIG. 4 shows a schematic representation of the tipper assembly of FIG. 3 in an intermediate position during raising of the tailgate.
Figure 5:
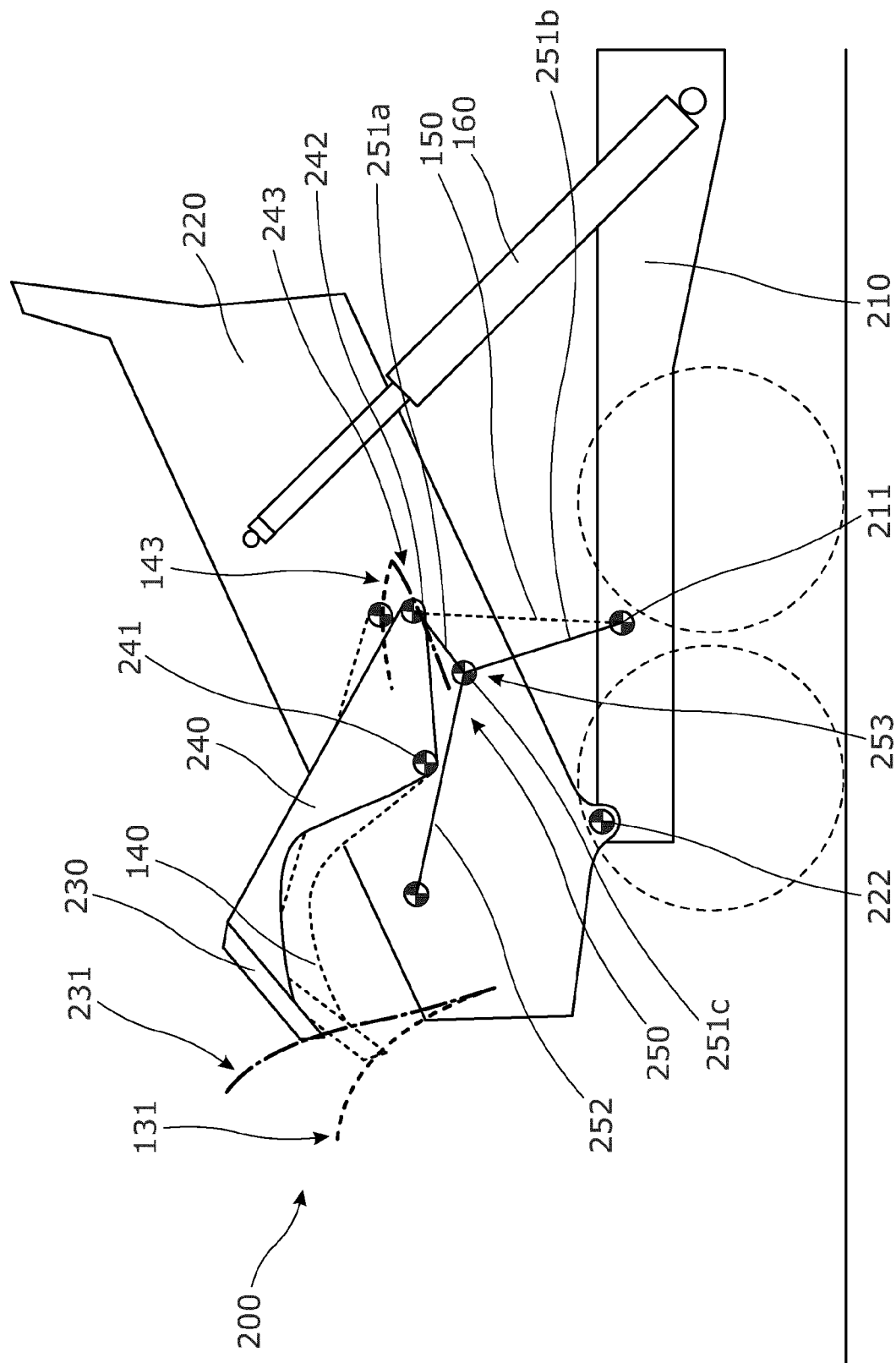
FIG. 5 shows a schematic representation of the tipper assembly of FIG. 3 in an intermediate position, showing the locus of movement of the tailgate and arm linkage point and a tipper assembly as in FIG. 1 showing the locus of movement of the tailgate and arm linkage point of the tipper assembly of FIG. 1.
Figure 6:
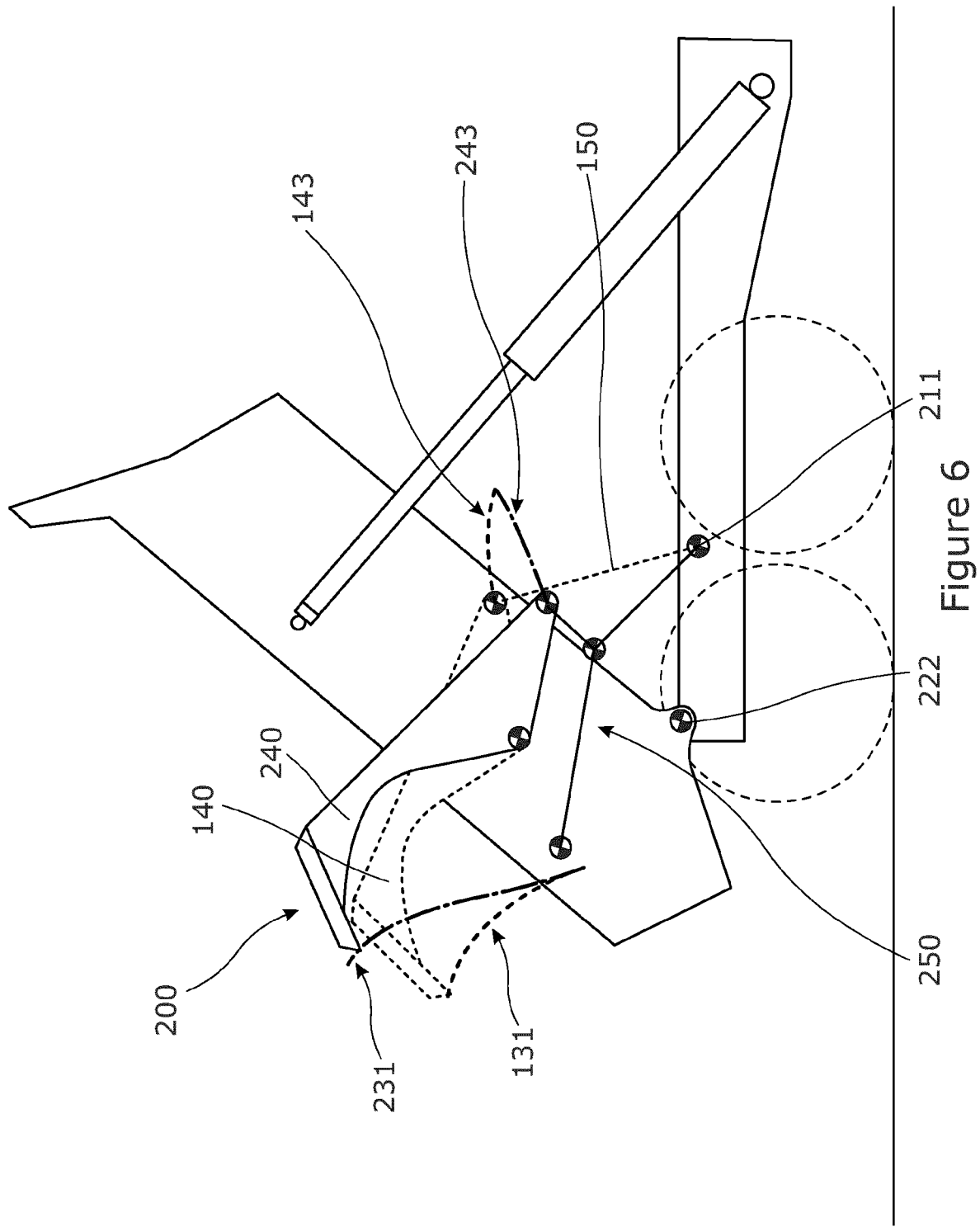
FIG. 6 shows a schematic representation of the tipper assembly of FIG. 3 in a raised position, showing the locus of movement of the tailgate and arm linkage point and a tipper assembly as in FIG. 1 showing the locus of movement of the tailgate and arm linkage point of the tipper assembly of FIG. 1.

A tipper assembly 200 in accordance with a first aspect of the present disclosure is shown in FIGS. 3 to 6. In FIGS. 3 and 4, the tipper assembly 200 is shown in the context of a tipper truck. The tipper assembly 200 may comprise a chassis 210 and a body 220 suitable for receiving a load of material to be tipped out by the tipper assembly. The body may be, for example, a truck bed or body, or a container body. The body 220 may be pivotable between a lowered position and a raised position. The body 220 may be pivotably attached to the chassis 210 at a body pivot axis 222 such that the body can be pivoted about a body pivot axis 222 from the lowered position as shown in FIG. 3 to the raised or lifted position (as shown in FIG. 6) in which the load of material can flow out of an end opening 221 of the body 220. The body pivot axis 222 may be arranged in a fixed position on the chassis 210 and may be arranged at or near a first end of the chassis 210, adjacent to the end opening 221 of the body 220.

A tipper actuator 160 may be arranged to act on and lift a free end of the body 220, distal to the end opening 221 of the body, thereby pivoting the body 220 about the body pivot axis 222 to move the body 220 into the raised position (i.e. the tipping position).

When the body 220 is arranged in the lowered position, shown in FIG. 3, a tailgate 230 may be arranged in a closed position across the end opening 221. The tailgate 230 may be fixedly attached to an arm 240. The arm 240 may be pivotably attached to the body 220 about an arm pivot axis 241 arranged in an intermediate portion of the arm 240, such that the arm 240 and the tailgate 230 may be pivoted together relative to the body 220.

A first linkage assembly 250 may comprise an arm link 251 attached to an arm linkage point 242, the arm linkage point 242 arranged at or near an end of the arm 240 distal to the tailgate 230. The arm link 251 may be non-extensible. The arm link 251 may be further attached to a chassis linkage point 211 on the chassis 210, thereby connecting the chassis linkage point 211 to the arm linkage point 242. The arm link 251 may be formed from a first element 251a pivotally attached to the arm linkage point 242 and a second element 251b pivotally attached to the chassis linkage point 211. The first element 251a may be pivotally attached to the second element 251b, thereby allowing bending or folding of the arm link 251 at the joint 251c of the first element 251a and the second element 251b, the joint 251c being arranged at an intermediate portion 253 of the arm link 251.

The first linkage assembly 250 may further comprise a rapid opening assembly comprising offset link 252. The offset link 252 may extend between a body linkage point 223 on the body 220 and the arm link 251. The body linkage point 223 may be disposed on a side of the body between the arm pivot axis and the tailgate opening. A first end of the offset link 252 may be pivotably attached to the body 220 and a second end of the offset link 252 may be attached to the arm link 251 at or near the joint 251c at the intermediate portion 253 of the arm link 251. The offset link 252 may be non-extensible.

As the body 220 is pivoted into its lifted position under the action of a tipper actuator 160, the arm pivot axis 241, being in a fixed position relative to the body 220, may move in an upwards arc relative to the chassis 210. The direction of movement of the tailgate 230 and the rotation of the body 220 about the body pivot axis 222 are illustrated by arrows in FIG. 4.

FIGS. 5 and 6 show a locus of movement 231 of the tailgate 230 and a locus of movement 243 of arm linkage point 242 of tipper assembly 200 as the body moves to the raised position. For comparison, FIGS. 5 and 6 also show the locus of movement 131 of a tailgate 130 and the locus of movement 143 of arm linkage point 142 as moved by a chain or tie 150 as shown in FIGS. 1 and 2. The locus of movement 143 remains at a fixed distance from the chassis linkage point 211.

In tipper assembly 200, on rotation of the body 220 about the body pivot axis 222 from the lowered to the raised position, the offset link 252 may pull the intermediate portion 253 of the arm link 251 to displace the intermediate portion 253 laterally such that the arm link 251 is curved, bent or folded. The rapid opening assembly may thereby be configured to create a v-shape in the arm link 251. The arm linkage point 242 and the chassis linkage point 211 may thereby be drawn closer together, as illustrated by locus of movement 243 in FIGS. 5 and 6. An effective length of the arm link 251, being the shortest distance between the arm linkage point 242 and the chassis linkage point 211, may thereby be reduced.

The above configuration of the first linkage assembly 250 may draw the arm linkage point 242 closer to the chassis linkage point 211 on rotation of the body 220 about the body pivot axis 222 from the lowered to the raised position. The tailgate 230 may therefore be lifted by the tipper actuator 160 as a result of the action of the first linkage assembly 250. The pivoting action may result in an arcuate motion of the tailgate 230 outwards and upwards from its original closed position to an open position as shown in FIG. 6. The shape of the arc of the locus of movement 243 may therefore be dictated by arc of movement of the body 220 and the shortening of the distance between the arm linkage point 242 and the chassis linkage point described above under the effect of the first linkage assembly 250. As shown in FIGS. 5 and 6, this may result in an increase in vertical movement of the tailgate 230 at the beginning of the motion of the body 220 from the lowered position, such that the tailgate 230 clears the open end of the body 220 faster, as shown by the increased angle of locus of movement 231 of the tailgate 230 compared to locus of movement 131 of the tailgate 130 in the known system. This may also result in an increased final height of the tailgate 230.

In this way, as the body 220 is tipped relative to the chassis 210, the speed of rotation of the tailgate 230 away from the end opening 221 is faster than the speed of rotation of the prior art tailgate 130 relative to the end opening 121. Consequently, other than in the lowered position, for any angular position of body 220 relative to the chassis 210, the tailgate 230 is further from the end opening 221 than for the same angular position (other than the lowered position) of the prior art body 120 relative to the chassis 110.

Further embodiments of the disclosure are described below. Features of the first embodiment and the following embodiments may be interchanged and combined as desired. In addition, in the following description only differences between the embodiments will be described in detail. In other respects the reader is directed to the description of the prior embodiment.

Figure 7:
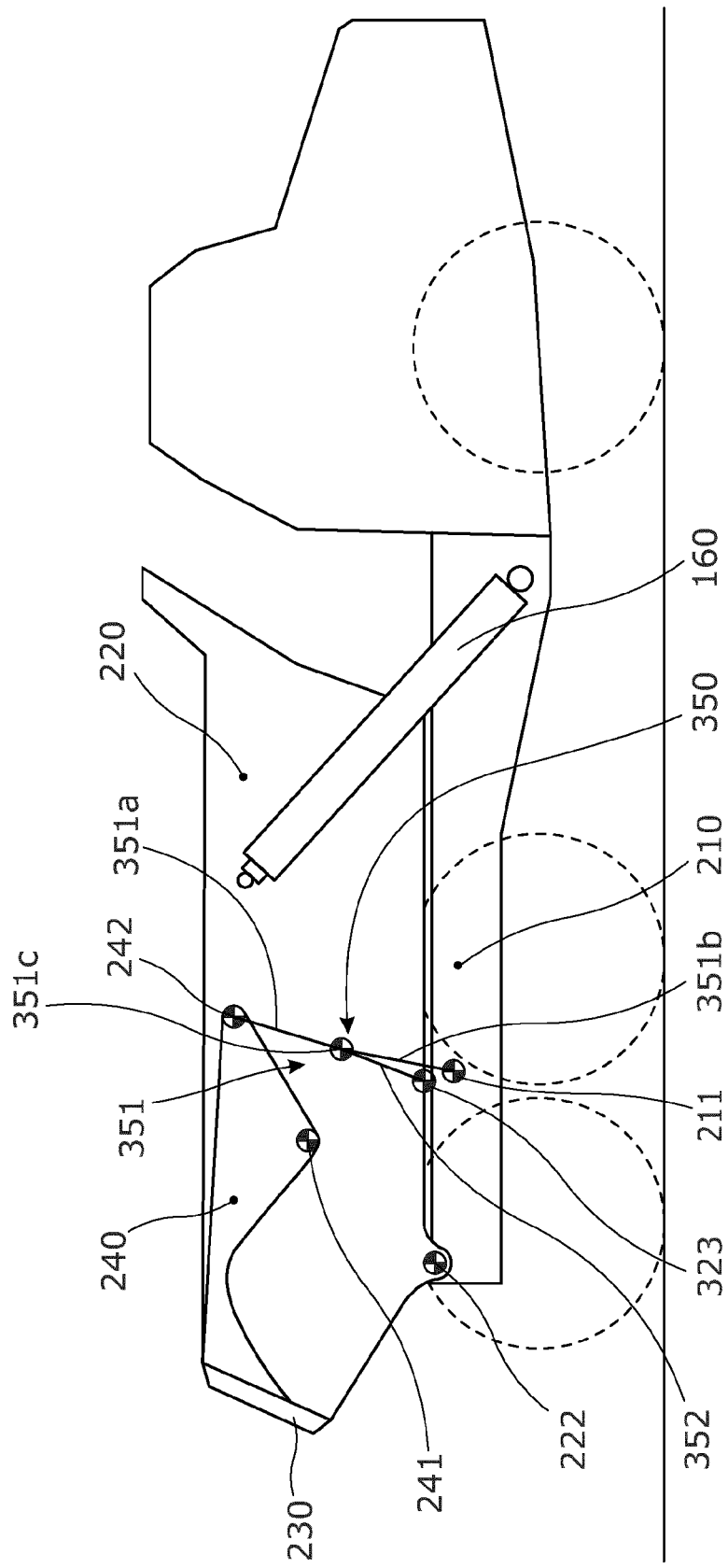
FIG. 7 shows a schematic representation of a further tipper assembly according to the present disclosure in a lowered position.
Figure 8:
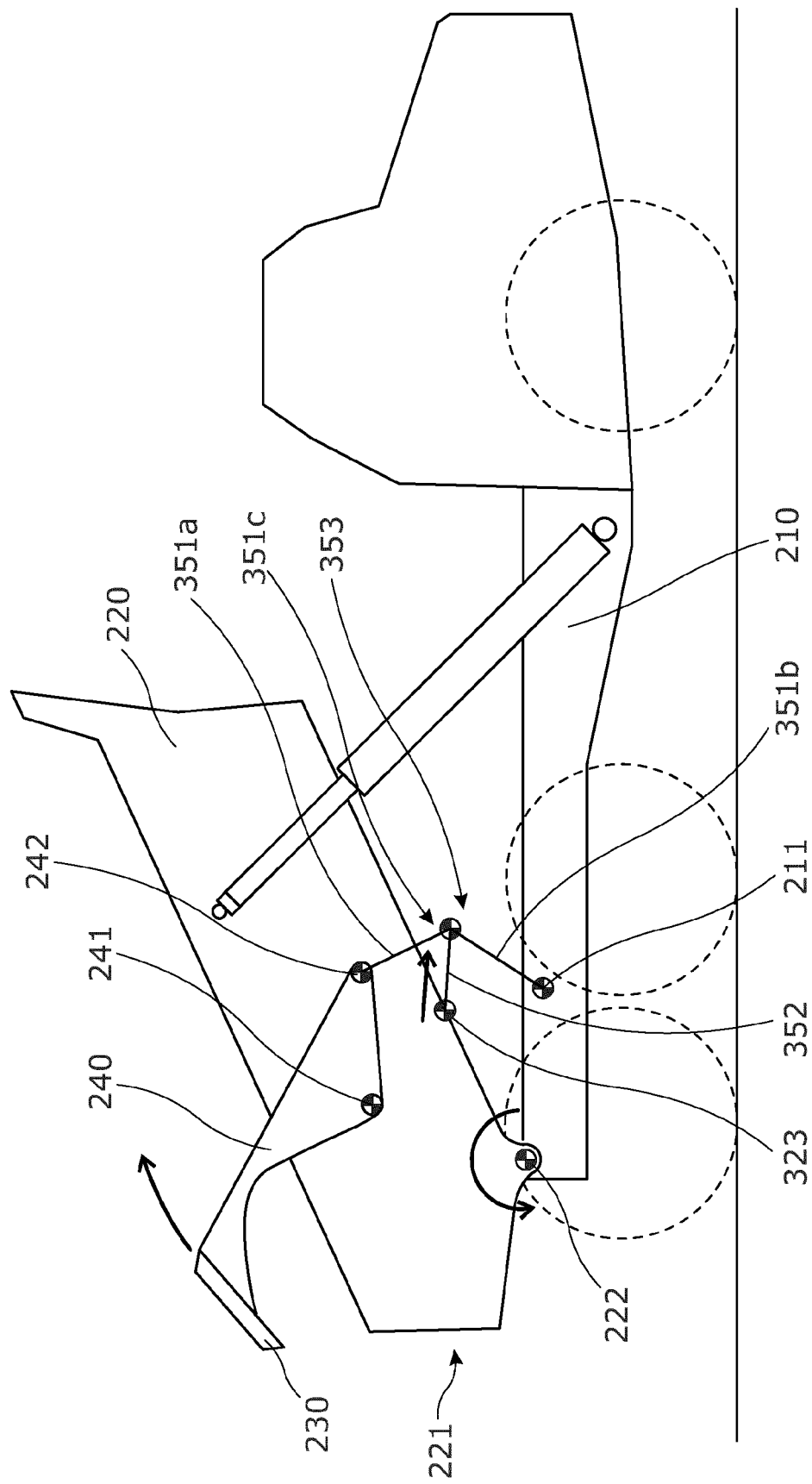
FIG. 8 shows a schematic representation of the tipper assembly of FIG. 7 in an intermediate position during raising of the tailgate.

FIGS. 7 to 10 show a further tipper assembly 300 according to the present disclosure. In FIGS. 7 and 8, the tipper assembly 300 is shown in the context of a tipper truck.

In this tipper assembly a first linkage assembly 350 may comprise an arm link 351 attached to an arm linkage point 242, the arm linkage point 242 arranged at or near an end of the arm 240 distal to the tailgate 230. The arm link 351 may be non-extensible. The arm link 351 may be further attached to a chassis linkage point 211 on the chassis 210, thereby connecting the chassis linkage point 211 to the arm linkage point 242. The arm link 351 may be formed from a first element 351a pivotally attached to the arm linkage point 242 and a second element 351b pivotally attached to the chassis linkage point 211. The first element 351a may be pivotally attached to the second element 351b, thereby allowing bending or folding of the arm link 351 at a joint 351c of the first element 351a and the second element 351b, the joint 351c being arranged at an intermediate portion 353 of the arm link 351.

The first linkage assembly 350 may further comprise a rapid opening assembly comprising an offset link 352. The offset link 352 may extend between a body linkage point 323 on the body 220 and the arm link 351. The body linkage point may be disposed on a side of the body between the arm pivot axis and the tailgate opening. A first end of the offset link 352 may be pivotably attached to the body 220 and a second end of the offset link 352 may be attached to the arm link 351 at or near the joint 351c at the intermediate portion 353 of the arm link 351. The offset link 352 may therefore have a first end having a fixed position relative to the body. The offset link 352 may be non-extensible.

As the body 220 is pivoted into its lifted position under the action of a tipper actuator 160, the arm pivot axis 241, being in a fixed position relative to the body 220, may move in an upwards arc. The direction of movement of the tailgate 230 and the rotation of the body 220 about the body pivot axis 222 are illustrated by arrows in FIG. 8.

Figure 9:
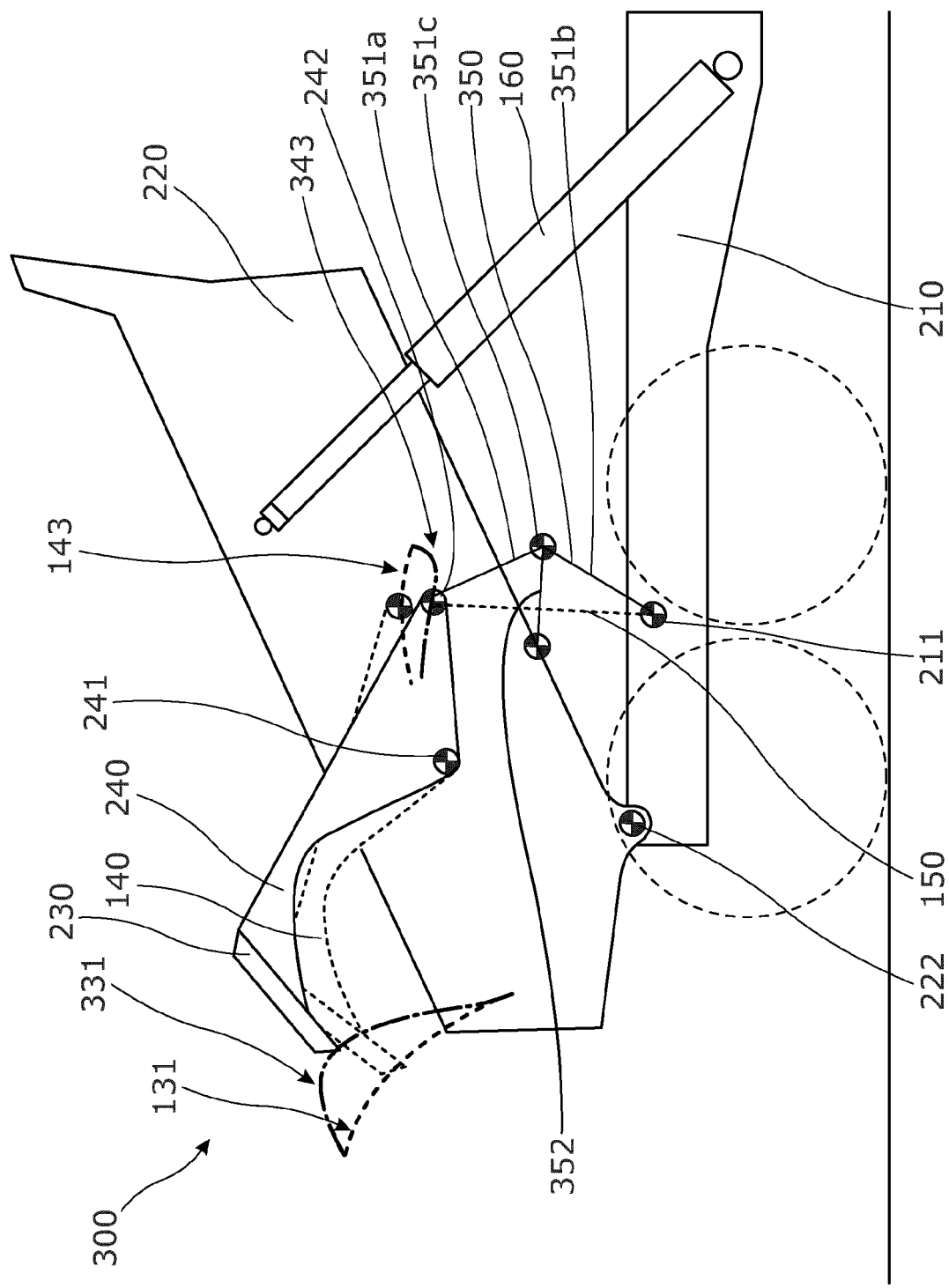
FIG. 9 shows a schematic representation of the tipper assembly of FIG. 7 in an intermediate position, showing the locus of movement of the tailgate and arm linkage point and a tipper assembly as in FIG. 1 showing the locus of movement of the tailgate and arm linkage point of the tipper assembly of FIG. 1.
Figure 10:
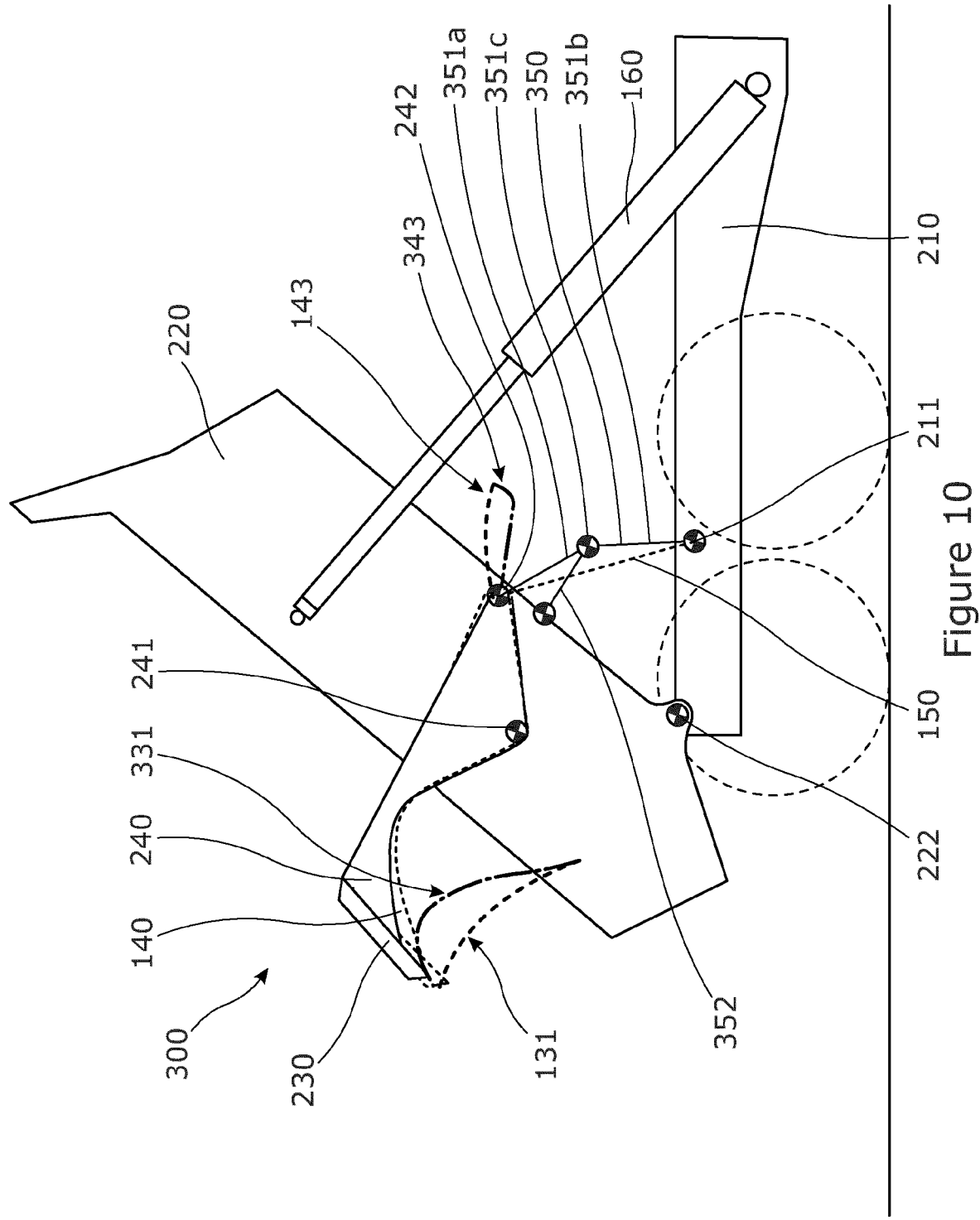
FIG. 10 shows a schematic representation of the tipper assembly of FIG. 7 in a raised position, showing the locus of movement of the tailgate and arm linkage point and a tipper assembly as in FIG. 1 showing the locus of movement of the tailgate and arm linkage point of the tipper assembly of FIG. 1.

FIGS. 9 and 10 show a locus of movement 331 of the tailgate 230 and a locus of movement 343 of arm linkage point 242 of tipper assembly 300 as the body moves into the raised position. For comparison, FIGS. 9 and 10 also show the locus of movement 131 of a tailgate 130 and the locus of movement 143 of arm linkage point 142 as moved by a chain or tie 150 as shown in FIGS. 1 and 2. The locus of movement 143 remains at a fixed distance from the chassis linkage point 211.

On rotation of the body 220 about the body pivot axis 222 from the lowered to the raised position, the offset link 352 may push the intermediate portion 353 of the arm link 351 to displace the intermediate portion 353 laterally such that the arm link 351 is curved, bent or folded. The rapid opening assembly may thereby be configured to create a v-shape in the arm link 351. The arm linkage point 242 and the chassis linkage point 211 may thereby be drawn closer together, as illustrated by locus of movement 343 in FIGS. 9 and 10. An effective length of the arm link 351, being the shortest distance between the arm linkage point 242 and the chassis linkage point 211, may thereby be reduced. The offset link 352 may be a strut suitable for withstanding compressive loading.

The above configuration of the first linkage assembly 350 may draw the arm linkage point 242 closer to the chassis linkage point 211 on rotation of the body 220 about the body pivot axis 222 from the lowered to the raised position. The tailgate 230 may therefore be lifted by the tipper actuator 160 as a result of the action of the first linkage assembly 250. The pivoting action may result in an arcuate motion of the tailgate 230 outwards and upwards from its original closed position to an open position as shown in FIG. 10. The shape of the arc of the locus of movement 343 may therefore be dictated by arc of movement of the body 220 and the shortening of the distance between the arm linkage point 242 and the chassis linkage point described above under the effect of the first linkage assembly 350. As shown in FIGS. 9 and 10, this may result in an increase in vertical movement of the tailgate 230 at the beginning of the motion of the body 220 from the lowered position, such that the tailgate 230 clears the open end of the body 220 faster, as shown by the increased angle of locus of movement 331 of the tailgate compared to locus of movement 131 of the tailgate 230 of the known system. This may also result in an increased final height of the tailgate 230.

In this way, as the body 220 is tipped relative to the chassis 210, the speed of rotation of the tailgate 230 away from the end opening 221 is faster than the speed of rotation of the prior art tailgate 130 relative to the end opening 121. Consequently, other than in the lowered position, for any angular position of body 220 relative to the chassis 210, the tailgate 230 is further from the end opening 221 than for the same angular position (other than the lowered position) of the prior art body 120 relative to the chassis 110.

Figure 11:
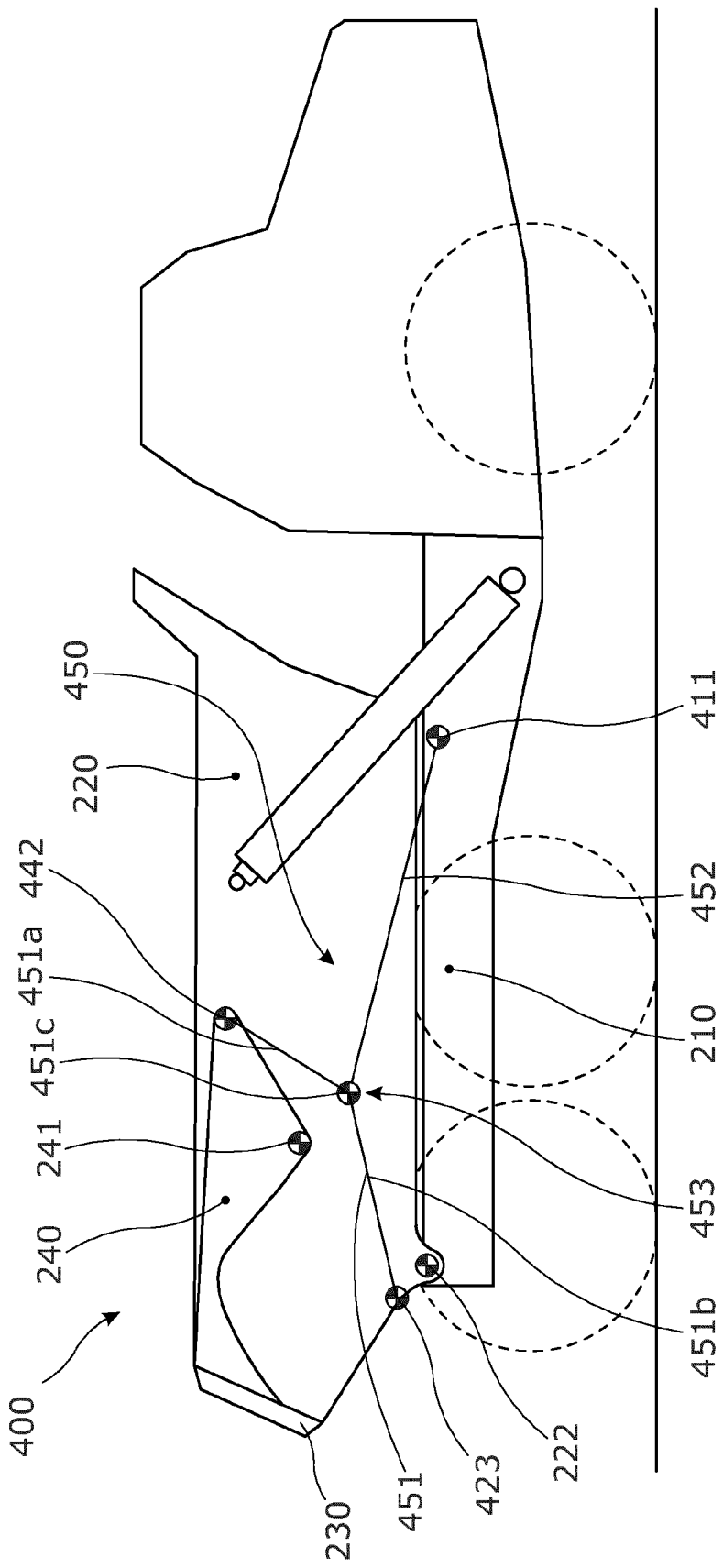
FIG. 11 shows a schematic representation of a further tipper assembly according to the present disclosure in a lowered position.

FIG. 11 shows a further tipper assembly 400 according to the present disclosure in the context of a tipper truck. In this tipper assembly, the first linkage assembly 450 comprises an arm link 451 connecting the arm linkage point 442 and the body linkage point 423. The arm link 451 may be formed from a first element 451a pivotally attached to the arm linkage point 442 and a second element 451b pivotally attached to a body linkage point 423. The first element 451a may be pivotally attached to the second element 451b, thereby allowing bending or folding of the arm link 451 at the joint 451c of the first element 451a and the second element 451b, the joint 451c being arranged at an intermediate portion 453 of the arm link 451.

The rapid opening assembly comprising offset link 452 may connect an intermediate portion 453 of the arm link 451 with the chassis linkage point 411. The offset link 452 may have a fixed overall length. On raising of the body 420 by the tipper actuator, the offset link 452 may resist movement of the intermediate portion 453 of the arm link away from the chassis 410 and may thereby draw the arm linkage point 442 down relative to the body 120 as the body 120 moves upwards. The rapid opening assembly may thereby be configured to create a v-shape in the arm link 451. An effective length of the first linkage assembly 450, being the shortest distance between the arm linkage point 442 and a distal end of the arm link 451, may thereby be reduced.

Whilst preferred embodiments of the present invention have been described above and illustrated in the drawings, these are by way of example only and non-limiting. It will be appreciated by those skilled in the art that many alternatives are possible within the ambit of the invention. For example, any one or more of the features of any embodiment may be combined and/or used separately in a different embodiment with any other feature or features from any of the embodiments.

In any embodiment, the arm link may be inextensible.

In any embodiment of the present disclosure the arm link may alternatively comprise a chain or wire or other similar element that is bendable or foldable at an intermediate point under the action of the offset link. If first element and second element of the arm link are replaced by a single bendable tie or chain, the joint may be replaced by a bending point or attachment point for the offset link, arranged at an intermediate portion of the arm link.

In any embodiment in which the offset link is configured to pull on the intermediate portion of the arm link, the offset link may comprise a flexible element such as a wire, chain, rope or similar tie suitable for carrying a tensile load, or a rigid element, for example a bar or rod or other similar tie suitable for carrying a tensile load. In any embodiment in which the offset link is configured to push on the intermediate portion of the arm link, the offset link may comprise a rigid element, for example a bar, rod or similar strut suitable for carrying a compressive load.

In any embodiment, on lowering of the body from the raised to the lowered position, the tailgate returns to the closed position under the action of the linkage assembly as a result of a lowering action of the tipper actuator.

In any embodiment the offset link may be configured to act (push or pull) the intermediate portion of the arm link on movement of the body into the raised position to displace the intermediate portion laterally such that the arm link is curved, bent folded. An effective length of the first linkage assembly, being the shortest distance between the arm linkage point and a distal end of the arm link, may thereby be reduced.

In any embodiment, the tailgate lift assembly may consist of simple mechanical links and connections (i.e. does not comprise actuators, motors, or hydraulic components).

In any embodiment, the tailgate lift assembly may be actuated by the movement of the body under the action of the tipper actuator.

In any embodiment, the first and/or second arm link may be arranged in a straight line or in a v-shape when the body is in the lowered position. For example, the arm link may be arranged with two elements or sections arranged at an angle to each other, or in a straight line when the body is in the lowered position. The creation of a v-shape in an arm link may therefore include creating a v-shape in a previously straight arm link or deepening an existing v-shape (for example by reducing an angle between two elements or sections of the arm link). The term v-shape may include u-shapes or similar curved shapes.

In the present disclosure, the term fixedly attached is used to refer to an attachment with little or no relative movement between the components. This may include the components in question being welded or bolted together, or being integrally produced as a single component. For example, in any embodiment of the present disclosure, the arm may be fixedly attached to the tailgate.

In any embodiment, the tipper assembly may comprise a second tailgate lift assembly configured to lift the tailgate from the closed position to the open position on movement of the body from the lowered position to the raised position. The first tailgate lift assembly may be arranged on a first side of the body and the second tailgate lift assembly may be arranged on a second side of the body.

The second tailgate lift assembly may be of the same construction as the first tailgate lift assembly. For example, the second tailgate lift assembly may comprise a second arm having a tailgate end fixedly attached to the tailgate and a second arm linkage point, the second arm being pivotally attached to the body about the arm pivot axis, the arm pivot axis being arranged between the tailgate end and the second arm linkage point, and a second linkage assembly connecting the second arm linkage point to the second chassis linkage point, the second linkage assembly comprising a second arm link and a second rapid opening assembly, the second rapid opening assembly having a first end attached to the body or chassis and a second end attached to an intermediate portion of the second arm link. The second rapid opening assembly may be configured to create a v-shape in the second arm link, drawing the second arm linkage point closer to the second chassis linkage point on rotation of the body about the body pivot axis from the lowered to the raised position.

INDUSTRIAL APPLICABILITY

In this way, it may be possible for the tailgate to be moved away from the opening more quickly, as it follows a different arc to that in the prior art, gaining height relative to the chassis more quickly in the initial phase of the movement. There may therefore be less chance of obstruction of the flow of material out of the body as the assembly moves to a tipping position.

The invention claimed is:

1. A tipper assembly comprising:
a chassis having a first chassis linkage point;
a body pivotally attached to the chassis about a body pivot axis, the body being pivotable between a lowered position and a raised position;
a tailgate moveable between a closed position in which the tailgate is arranged across an end opening of the body and an open position in which the tailgate is pivoted away from the end opening; and a first tailgate lift assembly configured to lift the tailgate from the closed position to the open position on movement of the body from the lowered position to the raised position;

wherein the first tailgate lift assembly comprises:
- a first arm having a tailgate end fixedly attached to the tailgate and a first arm linkage point, the first arm being pivotally attached to the body about an arm pivot axis, the arm pivot axis being arranged between the tailgate end and the first arm linkage point; and
- a first linkage assembly connecting the first arm linkage point to the first chassis linkage point, the first linkage assembly comprising an arm link and a rapid opening assembly, the rapid opening assembly having a first end attached to the body or the chassis and a second end attached to an intermediate portion of the arm link;

wherein the rapid opening assembly is configured to create a v-shape in the arm link, drawing the first arm linkage point closer to the first chassis linkage point on rotation of the body about the body pivot axis from the lowered to the raised position.

2. The tipper assembly as in claim 1 wherein:
the arm link is pivotally attached to the first arm linkage point and the first chassis linkage point; and
the first end of the rapid opening assembly is attached to the body at a first body linkage point, the first body linkage point preferably being disposed on a side of the body between the arm pivot axis and the tailgate opening.

3. The tipper assembly as in claim 1 wherein:
the arm link is pivotally attached to the first arm linkage point and a body linkage point; and
the first end of the rapid opening assembly is attached to the first chassis linkage point.

4. The tipper assembly as in claim 1 wherein the arm link comprises:
- a chain or wire; or
- a first element pivotally attached to a second element; or
- a flexible element.

5. The tipper assembly as in claim 1 wherein the rapid opening assembly comprises an offset link;
wherein the offset link is configured to laterally displace the intermediate portion of the arm link on rotation of the body about the body pivot axis from the lowered to the raised position such that the first arm linkage point and the first chassis linkage point are thereby drawn together.

6. The tipper assembly as in claim 5 wherein the offset link comprises;
- a chain or wire; or
- a rigid element.

7. The tipper assembly as in claim 5 wherein the offset link is configured to push the intermediate portion of the arm link.

8. The tipper assembly as in claim 5 wherein the offset link is configured to pull on the intermediate portion of the arm link.

9. The tipper assembly as in claim 1, the tipper assembly further comprising a second tailgate lift assembly configured to lift the tailgate from the closed position to the open position on movement of the body from the lowered position to the raised position, wherein the first tailgate lift assembly is arranged on a first side of the body and the second tailgate lift assembly is arranged on a second side of the body.

10. The tipper assembly as in claim 9 wherein the second tailgate lift assembly is of the same construction as the first tailgate lift assembly.

11. The tipper assembly as in claim 9, wherein the second tailgate lift assembly comprises:
- a second arm having a tailgate end fixedly attached to the tailgate and a second arm linkage point, the second arm being pivotally attached to the body about the arm pivot axis, the arm pivot axis being arranged between the tailgate end and the second arm linkage point; and
- a second linkage assembly connecting the second arm linkage point to the second chassis linkage point, the second linkage assembly comprising a second arm link and a second rapid opening assembly, the second rapid opening assembly having a first end attached to the body or chassis and a second end attached to an intermediate portion of the second arm link;

wherein the second rapid opening assembly is configured to create a v-shape in the arm link, drawing the second arm linkage point closer to the second chassis linkage point on rotation of the body about the body pivot axis from the lowered to the raised position.

12. The tipper assembly as in claim 1 further comprising a tipper actuator configured to lift the body into the raised position relative to the chassis, where in the first tailgate lift assembly is configured to be actuated by movement of the tipper actuator.

13. A machine comprising the tipper assembly as in claim 1.

14. A dump truck comprising the tipper assembly as in claim 1.

* * * * *